United States Patent [19]
Valster et al.

[11] Patent Number: 5,205,796
[45] Date of Patent: Apr. 27, 1993

[54] APPARATUS FOR SHAPING A REPLACEABLE LEGGING FOR WING PULLEYS PRIOR TO VULCANIZATION

[75] Inventors: Karl C. Valster; Allen V. Reicks, both of Pella, Iowa

[73] Assignee: Precision Pulley, Inc., Pella, Iowa

[21] Appl. No.: 946,401

[22] Filed: Sep. 17, 1992

Related U.S. Application Data

[62] Division of Ser. No. 688,449, Apr. 22, 1991.

[51] Int. Cl.⁵ ............................................ F16H 55/00
[52] U.S. Cl. ..................................... 474/185; 425/110
[58] Field of Search ................. 474/162, 166, 184–186, 474/191, 192, 902; 425/110; 29/892.1

[56] References Cited

U.S. PATENT DOCUMENTS

| | | | |
|---|---|---|---|
| 3,046,805 | 7/1962 | Van Gorp | 474/185 |
| 3,055,229 | 9/1962 | Mecham | 474/185 X |
| 3,354,735 | 11/1967 | Holz . | |
| 3,363,476 | 1/1968 | Brown . | |
| 3,392,594 | 7/1968 | Van Gorp | 474/185 |
| 4,233,853 | 11/1980 | Holz . | |
| 4,284,409 | 8/1981 | Van Teslaar . | |
| 4,308,019 | 12/1981 | Horkey et al. . | |
| 4,464,149 | 8/1984 | Klyn . | |
| 4,718,544 | 1/1988 | Herren . | |
| 4,956,914 | 9/1990 | Valster et al. | 474/185 X |

FOREIGN PATENT DOCUMENTS 3224593 1/1983 Fed. Rep. of Germany .

OTHER PUBLICATIONS

Article entitled "General Guide to the Properties of Rubber, Mechanical Rubber Products Corporation", Warwick, New York 10990-0503.
Brochure entitled "It Takes a Tough Wing Pulley to Beat the Pits . . .", Superlag, Worthington, OH 43085.

Primary Examiner—Thuy M. Bui
Attorney, Agent, or Firm—Henderson & Sturm

[57] ABSTRACT

The present invention relates to a replaceable pulley lagging for attachment to wing pulleys and includes a backing member having a shape which conforms to the contact bars of each of the wings of the wing pulley. These backing members have an adhesive and an elastomeric member vulcanized thereto along the length thereof for contacting an endless conveyor belt disposed around a wing pulley. The replaceable pulley lagging devices can be slid onto or off from the contact bars of the wing pulley. A method of forming these replaceable pulley lagging devices includes using an apparatus to push the backing member against an elastomeric substance in a mold and hold the backing member and elastomeric substance in the formed position until it can be vulcanized in an autoclave or the like.

1 Claim, 2 Drawing Sheets

APPARATUS FOR SHAPING A REPLACEABLE LEGGING FOR WING PULLEYS PRIOR TO VULCANIZATION

This is a division of Ser. No. 07/688,449, filed on Apr. 22, 1991.

TECHNICAL FIELD

The present invention relates generally to a replaceable pulley lagging for the contact bars of wing pulleys and also to a method of producing these replaceable pulley lagging devices.

BACKGROUND ART

Wing pulleys are utilized to support and/or drive endless conveyor belts for conveying materials from place to place. One example of a wing pulley is shown in U.S. Pat. No. 4,956,914 to Valster et al. Each of the wings of these wing pulleys have contact bars thereon for contacting the inside of the conveyor belt as it moves around the wing pulley. In the above mentioned patent, these contact bars are made of metal.

Under some circumstances, metal contact bars on wing pulleys will cause the conveyor belt to wear out prematurely. Consequently, softer lagging materials such as rubber have been devised, for example as shown in U.S. Pat. Nos. 3,363,476 to Brown; 3,392,594 to Van Gorp; 4,464,149 to Klyn and 4,836,361 to Harren.

When rubber or some other elastomeric material is used on the contact bar, it will obviously experience wear at a faster rate than if metal was used so this elastomeric lagging will need to be replaced on a fairly regular basis. Furthermore, it is sometimes desirable to change the composition of the contact surface to achieve an optimum result, such as moving to a softer elastomeric contact lagging if the conveyor belt is tending to wear out too quickly or, conversely, moving toward a harder elastomeric lagging if the lagging itself is wearing out too quickly.

It can also be appreciated by looking at the elastomeric or rubber lagging structures in the aforementioned patents that each invention uses a different structure for attaching the rubber or elastomeric lagging to each wing whereas a more universal system is desired so that by utilizing one structure, it could replace the lagging on a number of standard wing pulleys.

Such a standard replacement was conceived at one time and was referred to as a SUPERLAG lagging. This SUPERLAG replaceable lagging system used a polyelastomer extruded generally in the shape of the exterior portion of a standard contact bar for wing pulleys, but was made undersized so that it would stay onto a contact bar once it is slid over such contact bar by first sliding it on one end. A special tool was required to make this installation because of the tight fit required. One of the problems associated with this latter mentioned structure was that if the contact bar over which the SUPERLAG lagging was placed left any space between such lagging and the contact bar, flexing of this lagging would occur and this flexing or pulsating effect would cause the lagging to prematurely wear out. Consequently, while it would essentially achieve a desired amount of universality, this attempt to make it universal also made it susceptible to this flexing problem which led to premature failure.

Consequently, there is a need for a somewhat universal lagging system for wing pulleys which can be used on original equipment or can be used in a retrofit situation as an after market product. There is also a need for such a universal system which will not flex the elastomeric material unduly and therefore will not cause premature failure.

DISCLOSURE OF THE INVENTION

The present invention relates generally to a replaceable pulley lagging device and to a method of making it. The replaceable pulley lagging device includes a backing member having an interior portion with a substantially continuous interior cross sectional shape which generally conforms to the exterior portion of the contact bars of standard wing pulleys and is selectively and slidably movable between a removed position and an installed position wherein the backing member is disposed around at least a portion of the outward end of the contact bars. An elastomeric structure is attached along the length of the exterior portion of the backing member for contacting an endless conveyor belt disposed around the wing pulley while the backing member prevents unnecessary flexing of the elastomeric structure to prevent premature failure.

An apparatus is utilized in the process of making the replaceable pulley lagging device which includes a first member having an elongated depression therein for receiving an elastomeric substance in a plastic condition. A second member has a structure thereon for holding the backing member in a predetermined position with respect thereto. The method includes placing an elastomeric substance in a plastic or liquid condition into the elongated depression in the first member, securing the first and second members together such that the backing member is held into the depression to form the elastomeric substance into the shape of the depression, placing the first and second members with the backing member and elastomeric material therein into an autoclave and then applying appropriate amounts of heat, steam and pressure to the autoclave to vulcanize the elastomeric material and cause it to be secured to the backing member. An adhesive is preferably used additionally between the elastomeric material and the backing member to ensure that they do not separate during use.

An object of the present invention is to provide an improved replaceable lagging for wing pulleys.

Another object of the present invention is to provide a method of constructing a replaceable lagging for wing pulleys.

A further object of the present invention is to provide a replaceable lagging for wing pulleys which will not flex and cause premature failure.

A still further object of the present invention is to provide a generally uniform replaceable lagging which is economical to make, easy to install or replace and which is long lasting.

Other objects, advantages, and novel features of the present invention will become apparent from the following detailed description of the invention when considered in conjunction with the accompanying drawings.

BEST MODE FOR CARRYING OUT THE INVENTION

Figure 1:
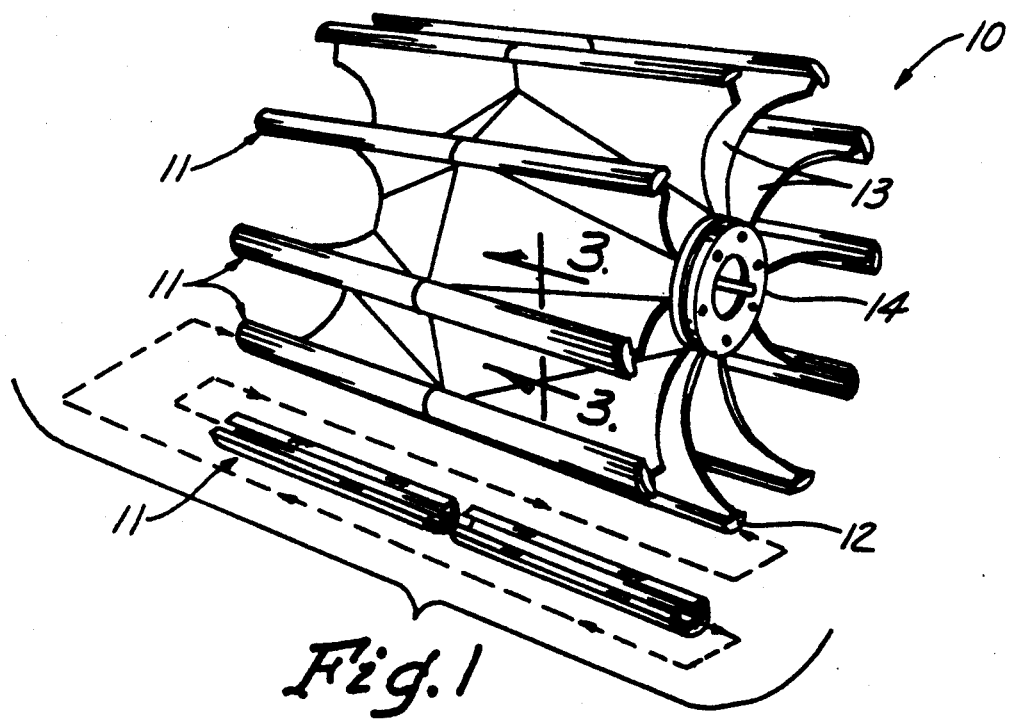
FIG. 1 is a perspective and partially exploded view of a wing pulley having replaceable lagging devices constructed in accordance with the present invention disposed thereon.

Referring now to the drawings wherein like reference numerals designate identical or corresponding parts throughout the several views, FIG. 1 shows a wing pulley (10) having lagging devices (11) attached to contact bars (12) disposed thereon. These wing pulleys (10) can be of many different types, for example like the one shown in U.S. Pat. No. 4,956,914 to Valster et al, which patent is incorporated herein by reference. The pulley (10) has a hub (14) on each end and a plurality of wings (13) which have metal contact bars (12) welded thereto.

Figure 3:
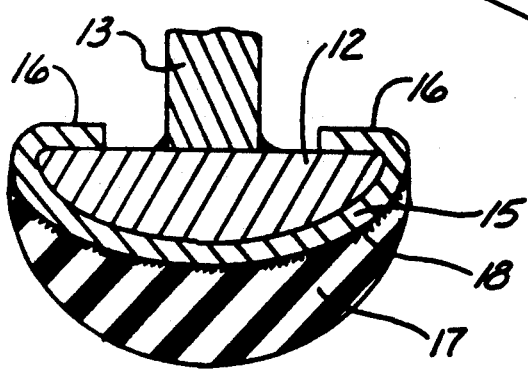
FIG. 3 is an enlarged partial cross sectional view taken along line 3—3 of FIG. 1.

The lagging devices (11) have a backing member (15) which can be made of steel or the like and which has flanges (16) thereon. An elastomeric member (17) is attached to the backing member (15) by an adhesive (18) and by a vulcanizing process which will be described below. The elastomeric member (17) as shown in FIG. 3 is thicker at the center thereof than at the sides thereof and gradually becomes thinner from the center toward the sides thereof. Also the elastomeric member (17) has an exterior arc with a radius of curvature which is less than the radius of curvature of the interior arc (FIG. 3).

Figure 4:
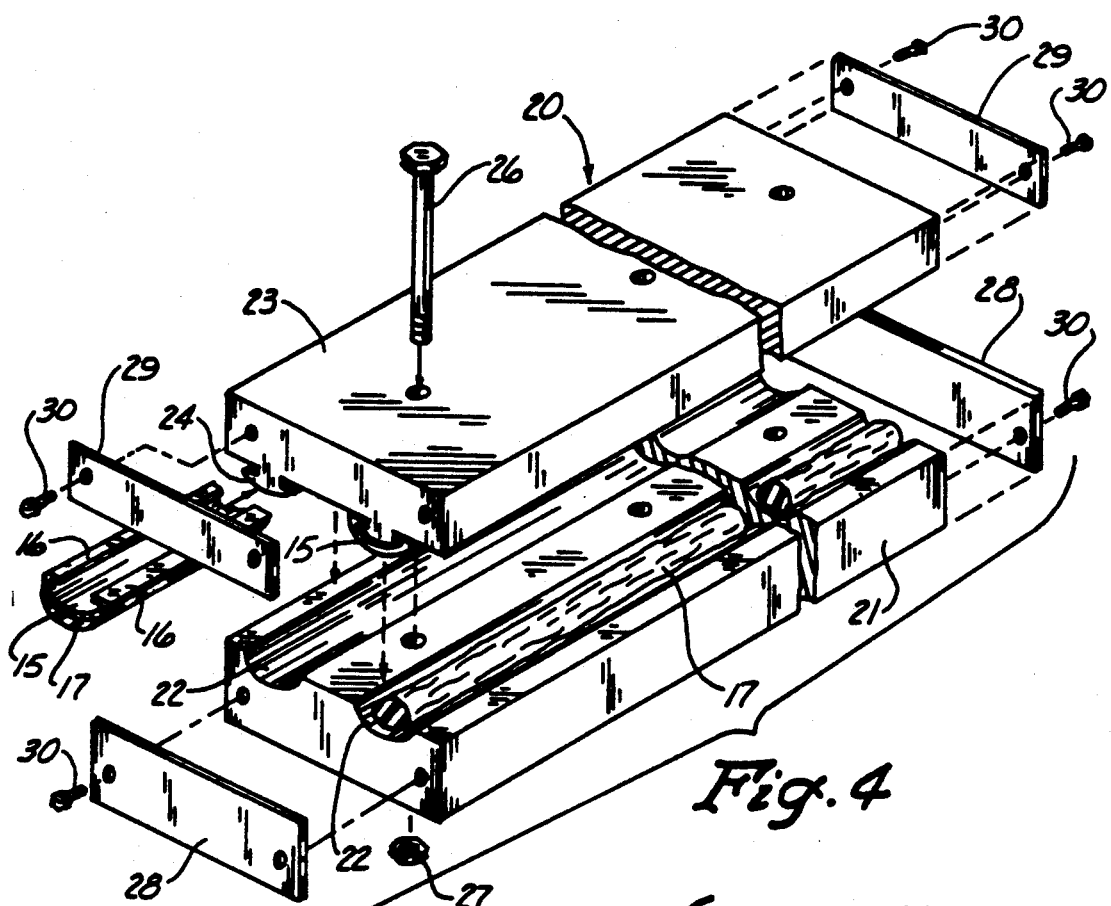
FIG. 4 is an exploded perspective view of an apparatus utilized to manufacture a lagging device of the present invention.
Figure 6:
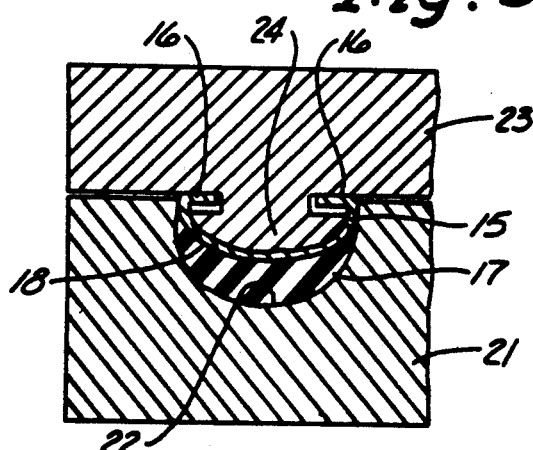
FIG. 6 is an enlarged partial cross sectional view taken along line 6—6 of FIG. 5.

Referring to FIG. 4, an apparatus (20) is shown for forming the elastomeric portion (17) into the shape desired and holding it against the backing member (15) so it can be vulcanized in the position shown in FIG. 6.

The apparatus (20) shown in FIG. 4 includes a first member (21) having one or more depressions (22) disposed therein which essentially serve as a mold for the elastomeric material (17). A second member (23) of the apparatus (20) includes projections (24) which are essentially the same shape as contact bars (12) shown in FIGS. 1, 2 and 3.

Figure 2:
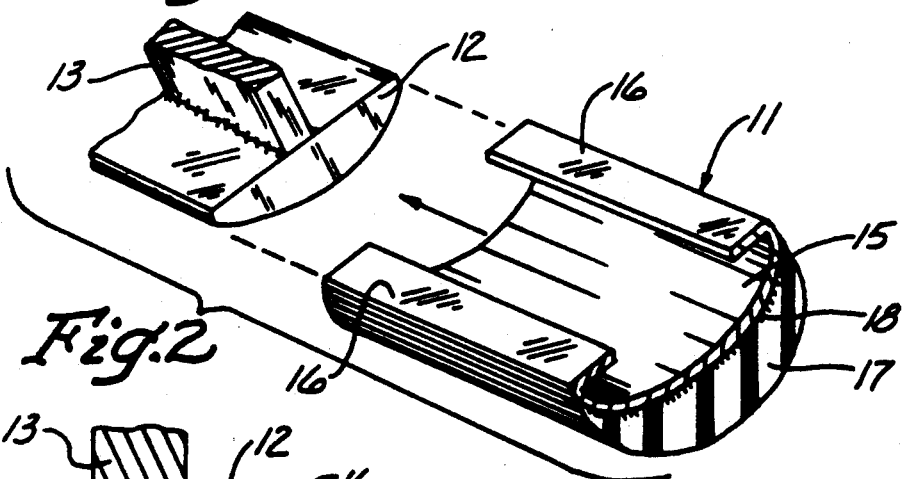
FIG. 2 is an enlarged partial perspective view of a portion of a standard contact bar on a wing pulley and showing how the lagging device of the present invention can be slid over it to produce a lagging contact surface which is elastomeric and has a metal backing to prevent flexing thereof.

The method of forming the lagging devices (11) is essentially as follows. The backing members (15) are first formed, preferably by bending sheets of steel into the configuration shown in FIGS. 2 and 3, although they could be formed by an extrusion process or the like of some other material which would eventually harden to be of a sufficient rigidity to prevent the flexing which was referred to above. The backing member (15) then has an adhesive (18) applied to the outer surface thereof as is shown in FIGS. 2 and 3, this adhesive being chosen based upon the type of elastomeric substance (17) which is chosen.

The elastomeric substance (17) can be for example natural rubber, neoprene (chloroprene), nitrite (BUNA-N), silicone, styrene butadiene (SBR) or EPDM, for example. Once the final hardness and physical properties of the elastomeric material (17) desired have been chosen and consequently, the material for which it is to be made has been chosen, this elastomeric material would be placed into the cavities (22) for example as shown in the frontmost cavity (22) in FIG. 4. This elastomeric material (17) is normally in a plastic or liquid condition when it is put into the depression (22). Also, the backing members (15) with the adhesive (18) applied thereto would be placed on holding members (24) on member (23). The entire assembly (20) would then be clamped together with bolts (26), nuts (27), end pieces (28) and (29) and fasteners (30) for the purpose of confining, holding and shaping the elastomeric material (17) and forming it into the shape shown in FIG. 6.

Figure 5:
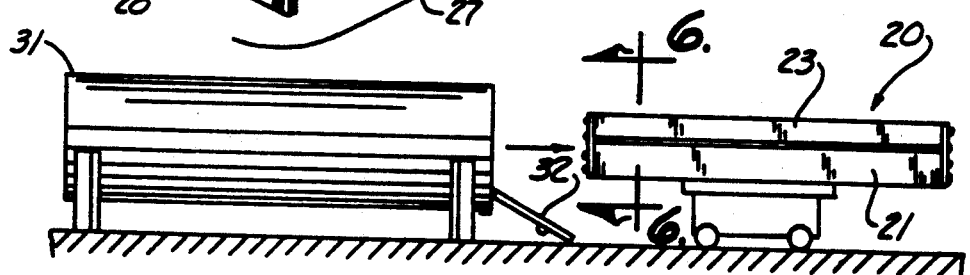
FIG. 5 is a side elevational view to schematically show an autoclave and the forming and holding mechanism of FIG. 4 clamped together which is used with the autoclave to vulcanize elastomeric material and hold it to a backing member.

Once the apparatus (20) has been assembled with the backing members (15) and elastomeric materials (17) disposed therein as shown in FIGS. 5 and 6, then it is inserted into an autoclave (31) having a door (32) on one end thereof. Once the apparatus (20) is inside the autoclave (31), appropriate amounts of steam, heat and pressure are applied. For example, if neoprene is used, it has been found that the autoclave can be heated to 285°–315° F. with 35 psi of steam for 35–40 minutes to achieve the desired vulcanization of the elastomeric material (17). The use of other elastomeric materials may require adjustments to the temperature, steam pressure and time of vulcanization within the autoclave (31).

Once the vulcanization process is complete, the apparatus (20) is removed from the autoclave (31) and is disassembled in a reverse manner to which it was previously assembled. Once that has been done, the lagging devices (11) can be removed and utilized on a wing pulley such as the wing pulley (10) shown in FIG. 1. In the preferred embodiment shown in FIG. 1, two of the lagging devices (11) are used to cover the entire width of each of the contact bars of the wing pulley (10).

If during the use of the wing pulley (10) having the lagging devices (11) attached thereto, the conveyor belt associated therewith tends to wear too quickly, a different lagging device (11) can be used, by using a softer material for the elastomeric portion (17) to ameliorate the wearing problem on the belt. If, conversely, the elastomeric material (17) is wearing down too quickly, these lagging devices (11) can be replaced by similar ones using an elastomeric material (17) which is harder so that the lagging devices (11) last longer. It will be appreciated that an optimum material for the elastomeric portion (17) can eventually be chosen.

While the shape of the backing members (15) have been chosen to conform to the shape of the contact bars (12) so that they can be held thereon by frictional contact therewith, other wing pulleys may have contact bars of different shapes than the contact bar (12). If that is the case, then the backing member (15) would be formed of an appropriate different shape to complement that of the wing pulley and so that the backing member can be easily slid thereon and held in place by friction. Furthermore, sometimes these contact bars (12) have been used without anything over the belt contacting surface. These contact bars (12) can become worn to the point that the wing pulley (10) needs to be replaced or the contact bars (12) need to be removed and replaced, which is an expensive proposition. Instead of replacing worn contact bars (12), lagging devices (11)

can be utilized to merely slip over the worn contact bars (12) to thereby refurbish the wing pulley (10) in a quick and easy manner. By this method, the life of a wing pulley can be greatly extended.

Obviously, many modifications and variations of the present invention are possible in light of the above teachings. It is therefore to be understood that, within the scope of the appended claims, the invention may be practiced otherwise than as specifically described.

We claim:

1. An apparatus for shaping a replaceable lagging for wing pulleys prior to vulcanization of a portion of said replaceable lagging comprising:

a first member having an elongated depression therein for receiving an elastomeric substance in a plastic condition;

a second member;

holding means connected to said second member for selectively holding a backing member in a predetermined position with respect thereto; and means for selectively securing said second member to said first member so that said backing member extends into the elongated depression in said first member, thereby forming said elastomeric substance into the shape of said depression prior to and during a vulcanization process.

* * * * *